United States Patent [19]
Nishizawa

[11] 3,800,956
[45] Apr. 2, 1974

[54] VESSEL FOR CHEMICAL ACTION

[76] Inventor: Hideyuki Nishizawa, No. 68, Nakazato-machi, Kita-ku, Tokyo-to, Japan

[22] Filed: July 2, 1971

[21] Appl. No.: 159,435

[30] Foreign Application Priority Data
Nov. 2, 1970  Japan.................................. 45-09153
July 10, 1970  Japan............................... 45-688927

[52] U.S. Cl................. 210/533, 210/198 C, 23/292
[51] Int. Cl............................................ B01d 15/08
[58] Field of Search ...... 210/31 C, 198 C, 313–318, 210/418, 419; 55/67, 386; 23/259, 292; 233/26; 222/549, 567–572

[56] References Cited
UNITED STATES PATENTS

| | | | |
|---|---|---|---|
| 3,121,519 | 2/1964 | Cherba | 222/568 X |
| 3,168,969 | 2/1965 | Krieps | 222/568 X |
| 3,081,029 | 3/1963 | Gauslaa | 23/259 X |
| 3,544,281 | 12/1970 | Phillips | 23/292 |
| 3,615,235 | 10/1971 | Habina | 210/198 C X |

Primary Examiner—John Adee
Attorney, Agent, or Firm—W. Robert Baylor

[57] ABSTRACT

A vessel particularly suitable for effecting separation of the components of a multi-component liquid mixture in chromatographic or centrifugal separation processes that is utilized in the manufacture of chemical substances, chemical analysis and various scientific experiments. Each of the two embodiments provide a vessel having valve means on the bottom of the vessel to effect a fine control of the liquid flow therefrom.

1 Claim, 3 Drawing Figures

VESSEL FOR CHEMICAL ACTION

BACKGROUND OF THE INVENTION

This invention relates to a vessel for use in chemical operations such a centrifugal separation, column chromatography and the like. In the usual case of separating one component from a multi-component solution, the initial step is to dissolve in a solvent capable of dissolving all the components therein, and the resulting solution is mixed with a second solvent which dissolves only one component thereof. The resulting solution is agitated and the desired single component is transferred to the second solvent. Then both solvents are subjected to a phase separation by the difference of the specific gravity thereof whereby the solvent extraction is carried out.

In the solvent extraction which is employed in the separation of a multicomponent solution, where an emulsion is formed among the various components, it takes a considerably long time to accomplish the phase separation. Where the emulsion is formed, the various components are subjected to the centrifugal separation process after the agitation operation is completed, it has been well known that in many cases the time required for the phase separation can be remarkably reduced. Further, a glass separating funnel which is frequently used in experiments as the vessel for the solvent extraction may be of the spindle type or eggplant type. This vessel has a relatively small diameter tube and includes a cock for controlling the flow rate of the liquid located at the lower portion thereof. This vessel cannot be used in the centrifugal separation process because the vessel cannot be mounted on the normally used small sized tube holder of the centrifugal separator. Also, even if the vessel is adapted to the centrifugal tube by reducing the dimensions thereof there is the problem of the cock valve falling off because of the centrifugal force. Thus, the achieving of the desired separation is difficult. As described in the foregoing, it is not possible to effect the centrifugal separation by using the separating funnel, and therefore the centrifugal separation is carried out by placing the liquid which produces the emulsion to be phase separated in the centrifugal tube. In this case, after the centrifugal separation process is applied, both phase separated liquids are suctioned individually by means of pipettes and then are required to be transferred to other vessels. This suction removal technique is not only troublesome work but also involves the difficulty in making a complete separation of the phase separated liquids.

Also, in employing a chromatographic column as the separating process of the dissolved components in the solution, a fixed phase material fills the glass vessel to form a column. The specimen is adsorbed in the liquid and the developing solvent flows down. The solution that contains the separated solute flows down sequentially from the lower end of the column. The vessel which is used in column chromatography is normally provided with a ground glass made cock. This cock adjusts the flow rate of the dropped solvent which flows from the lower end portion thereof. There is a requirement that the adjustment of the flow rate of the dropped solvent which is to be examined must be carried out in extreme minute droplets to properly determine the characteristics of the column chromatography.

In case there is the above-mentioned requirement, a valve body has been devised wherein a groove is formed in the circumferential direction and its width is gradually reduced toward its tip so as to communicate with an opening at an upper stream of the valve body and such a valve body has been used. However, the use of such a valve body has the disadvantage of slippage from the valve seat when the use of such a valve body extends over a long period of time.

Furthermore, in a situation where alkaline liquid is used in the experiment, the fitted surfaces of the valve body and valve seat become jammed and the rotation of the valve body and valve seat become impossible. Although there is a way to solve the jamming problem by the use of a valve body made of Teflon, this requires the valve seat and valve body to be machine fitted which generally results in an increased cost.

OBJECTS OF THE INVENTION

One object of the present invention is to provide a vessel which can be used as a centrifugal tube and a separating funnel.

Another object of the present invention is to provide a vessel which includes the feature of an opening for the flow of liquid droplets, a fine adjustment of the flow rate of the droplets and an absence of leakage even if a centrifugal force is applied thereto.

A further object of the present invention is to provide a vessel for column chromatography which can be used over a long period of time safely and which includes a valve arrangement in which an alkaline liquid may be used in the experiment.

DESCRIPTION OF THE PREFERRED EMBODIMENTS

The vessel of the present invention comprises a cylindrical body made of glass having an outflow tubular portion for passage of liquid. A passageway is provided concentrically within the tubular portion at the bottom end of the cylindrical body and has an inside diameter which is substantially smaller than an inside diameter of the cylindrical body. Further, a closure cap member having a flat surface is utilized to operatively cooperate with the end of the passageway and is adapted to be screwed to a circumferential surface of the cap member. The cap member has a bottom center zone for closing the liquid outflow passageway by cooperating with a flat surface and a through hole positioned eccentrically in a bottom wall of the cap member.

Figure 1:
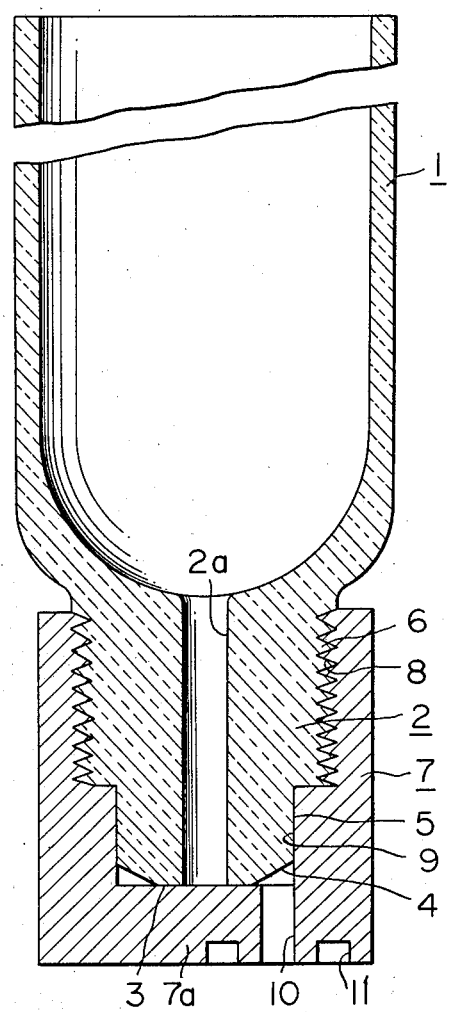
FIG. 1 is a cross sectional view of a centrifugal tube for liquid separation in accordance with the present invention.

The details of the present invention will be described by referring to the accompanied drawings. In FIG. 1, embodiment showing a centrifugal tube, there is provided a glass vessel having an upper cylindrical body portion 1 and a lower outflow tubular portion 2 having an outflow liquid passageway $2a$ whose diameter is substantially smaller than inside diameter of the cylindrical body. The passageway $2a$ is formed concentrically with respect to the cylindrical body 1. The end face 3 of the tubular portion 2 is finished smooth and flat and its circumferential edge is chamfered so as to form a conical surface 4. Furthermore, the circumferential surface of the tubular portion 2 is fabricated so as to have a smooth cylindrical surface 5 in only the zone of a substantial length in the axial direction from the end face of the tubular portion 2, and to have a threaded portion 6 whose effective diameter is substantially larger than an outside diameter of the cylindrical surface 5. The threaded portion 6 is formed as a the coupling portion and lies between the termial end of the cylindrical surface 5 of the tubular portion 2 and the bottom of the cylindrical body 1.

A cap member 7 which is made of, for example, a transparent plastic material and which has a chemical resistance and high workability, is constructed of a cylindrical shape and has a flat bottom. The cap member 7 is provided with a stepped hole therethrough whose opening is of larger diameter than the bottom exterior opening. The cap member 7 has an internal threaded portion 8 which is operatively screwable with the threaded portion 6 as hole 9 of a small diameter is formed so that its diameter is almost equal to diameter of the cylindrical surface 5. Thus, the end face 3 and the internal bottom portion of the cap member 7 are adapted to be liquid tight and fittably engaged, and the axial dimension thereof is arranged to be nearly equal to a distance from the end face 3 of the cap member 7 to the terminal end of the cylindrical surface 5. Furthermore, a bottom plate 7a of the cap member 7 is formed with a passageway 10 located at an eccentric position which passageway is within the bottom plate 7a in the axial direction. This passageway 10 is preferably positioned so as to communicate with the hole 9 and the diameter of the passageway 10 is preferably small to such an exent that it does not interfere with the conical surface 4. Also the cap member 7 is arranged so that its external shape is of such type so that it can be inserted into a hole for mounting the centrifugal tube that is ordinarily used in a centrifugal separator. The whole unit of the vessel can be safely and positively secured on the centrifugal separator. Furthermore, on there is mounted an external surface of the bottom plate 7a an annular groove 11 having a certain depth is formed concentrical with the passageway 10.

The centrifugal tube tht is adapted for liquid separation according to the present invention having the foregoing construction is to be used in the following manner. Namely, the cap 7 is screwed on the tubular portion 2. Then, the liquid containing the emulsion to be phase separated is placed in the cylindrical body 1 and is inserted in the inserting hole of the tube of the rotating body of the centrifugal separator which is not shown in the drawings. The cylindrical is caused to rotate for a predetermined time at a fixed speed to effect the centrifugal separation, whereby the emulsion is phase separated into a heavy liquid phase and a light liquid phase. Now, the centrifugal tube for liquid separation is removed. The threaded portion 8 of the cap member 7 is loosened while the interfacial surface of both phases are directly viewed. A a very minute gap is formed between the end face 3 of the tubular portion 2 and the bottom surface of the cap member 7 and the heavy liquid phase is caused to discharge through the gap and the passageway 10. After the heavy liquid phase is discharged, the end face of the tubular portion 2 is sealed by the bottom surface of the cap member 7 by clamping the cap member again so as to prevent the outflow of the light liquid phase. The light liquid phase is discharged from the upper portion by tilting the cylindrical body 1.

According to the present invention, as it will be obvious from the foregoing description, the vessel which can be positively inserted into the inserting hole of the centrifugal tube of the centrifugal separator can be rotated safely and at the same time the outflow of the liquid droplets can be controlled. Therefore the emulsion that is supplied to the centrifugal separator can be phase separated into the heavy liquid phase and light liquid phase within a short period of time. Thus, both phases after the phase separation operation can be discharged without depending upon a suctioning operation such as is performed by means of a pipette and the like. Also, as the cylindrical body 1 and the cap member 7 are clamped by the threaded arrangement thereof. There is no possibility that the phase separated liquids will leak out. Also, as the cap member 7 moves outwardly of the radial direction of the centrifugal separator during the centrifugal separation, the centrifugal force that works on the vessel eliminates the backlash between the threads, and the end face of the outflow passage member is urged against the internal circumferential surface of the cap, whereby the prevention of the liquids becomes furthermore improved. Further, since the passageway 10 is surrounded by an annular groove 11 during the above discharge, there is no possibility that the liquid will flow along the bottom surface of the cap member 7.

In the above embodiment, the shapes of the cap member and cylindrical body can be, of course, modified conform with other shapes of the inserting hole of the centrifugal tube of the centrifugal separator.

Figure 2:
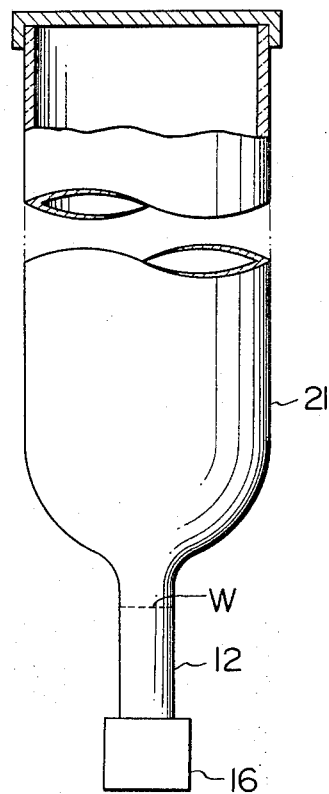
FIG. 2 is a perspective view of a column chromatography in accordance with the present invention.
Figure 3:
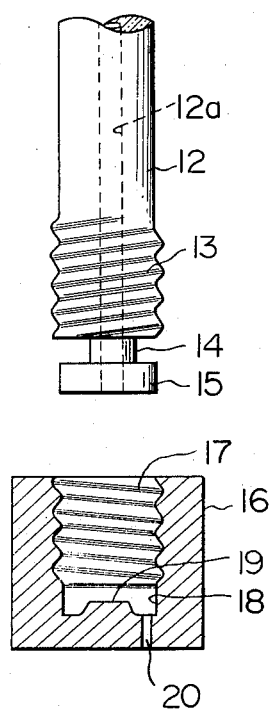
FIG. 3 is a disassembled view, part in cross section, showing a bottom tubular portion and cap member of the FIG. 2 embodiment.

FIG. 2 shows a perspective view of a vessel 21 for performing experiments exploiting the properties of columnar media, for instance column chromatography FIG. 3 shows the lower part of the vessel and includes a valve plate 15 which is integrally connected to a threaded portion 13 that is provided on an end of a glass thin tube 12 which is provided with an outflow passage 12a. The passage 12a has a diameter which is substantially smaller than that of the diameter of the vessel 21 and extends in the lower end of the vessel 21 through the threaded portion 13 and a reduced diameter portion 14. On the other hand, a cap member 16 which cooperates with the thin tube 12 is made of synthetic resin such as Teflon (trade name) and is formed with a threaded hole 17 there through. The threaded cap member 16 operatively screwed to the threaded portion of tee thin tube 12. The cap member 16 has a valve chamber 18 which is tightly engaged with an external periphery of a valve plate 15. The bottom surface of a valve chamber 18 is provided with a protruded portion 19 of a conical shape in its central portion. At an eccentric position on the bottom surface of the cap member 16, an opening 20 is formed.

In the vessel having the foregoing construction, the valve plate 15 and cap member 16 function as follows. Namely, the cap member 16 is screwed on the thin tube 12. When they are screwed clamped tightly, the uppermost surface of the protruded portion 19 is tightly pressed against the valve plate 15. The passage 12 of the thin tube 12 is closed, and the outflow of the liquid from the vessel will not taken place. Also, when the cap member 16 is gradually loosened, a gap is formed between the uppermost surface of the protruded portion 19 and the valve plate 15, and the droplets of the liquid that fall from the opening 20 can be observed. The formation of this gap is caused by the screwing action between the cap member 16 and thin tube 12, and its adjustment can be carried out minutely; therefore a fine adjustment of the amount of liquid droplets is made possible. Accordingly, the present embodiment of FIGS. 2 and 3 is particularly suited as a vessel for effecting column chromatography.

As stated previously, the protruded portion 19 of the cap member 16 is provided for the purpose of obtaining the tight contact with a valve plate 15. Thus, and it is possible to provide the protruded portion on the valve plate and to make the bottom of the cap in flat form or to make both the valve plate and cap bottom in flat form and to omit the protrusion.

In the foregoing proposed construction, the upper portion of the thin tube is welded to the lower end of the cylindrical body 21. Thus, manufacture thereof can be carried out simply and at a lower cost as compared with the construction of a cock and vessel type.

The chromatography column of the present invention having the foregoing construction has many advantages. It facilitates easy adjustment of the flow rate of the liquid. There is no chance that the cock will fall off during the use thereof. A practical use thereof is that the washing can be easily carried out as the construction is simple. Also when the powder which is used as the fixed phase of the chromatography is packed, an operational step of the process of obtaining a uniform packing condition is normally by placing the powder from the upper end of the vessel and dropping the vessel lightly on the table. But in the instant process, the Teflon made cup has effect of protecting the glass which is positioned at the lower end thereof, and prevents the supporting table from being damaged, and it does not interfere with the housing of the vessel.

While a certain illustrative embodiments of the present invention have been shown in the drawings and described above in considerable detail, it should be understood that there is no intention to limit the present invention to the specific embodiments disclosed. On the contrary it is the intention to cover all modifications, alternative constructions, equivalents and uses of the present invention.

I claim:

1. A vessel for effecting separation of the components of a multi-component liquid mixture comprising in combination:

an upright cylindrical body made of glass and adapted to contain a multi-component liquid mixture, said cylindrical body being open at the top thereof and having an outflow tubular portion at the bottom thereof, said tubular portion integrally fixed in a concentric manner with respect to said cylindrical body, said tubular portion having a passageway centrally positioned for the flow of liquid therethrough, said tubular portion having an external threaded portion and a bottom portion, said passageway having an inside diameter which is substantially smaller than an inside diameter of said cylindrical body;

a cap member made of plastic material and having an internal threaded portion for cooperatively engaging said external threaded portion of said tubular portion, said cap member having an internal flat bottom surface portion; a valve plate of the disc type integrally attached to said bottom portion of said tubular portion, said valve plate being concentrically positioned with respect to said passageway;

a circular elevated plateau section integrally formed on said internal flat bottom surface portion of said cap member and concentrically surrounded by an annular valve chamber, the diameter of said plateau section being substantially larger than the diameter of said passageway and being substantially equal to the diameter of said annular valve chamber; said valve plate located opposite to said plateau section and adapted to cooperatively frictionally contact one another to define a closed position and to move apart to define an open position; and a hole located within said annular valve chamber and extending through said cap member, said hole positioned eccentrically with respect to said centrally positioned passageway and communicating with said passageway, said valve plate, said plateau section, said annular valve chamber and said hole cooperatively forming a valve arrangement between said bottom portion of said tubular portion and said flat bottom surface portion;

said hole communicating with said passageway when said valve plate and said plateau section are in an open position for permitting the flow of liquid therethrough.

* * * * *